Sept. 1, 1964  S. OTTO  3,146,565
APPARATUS FOR FORMING AND FILLING CONTAINERS
Filed Sept. 29, 1960  6 Sheets-Sheet 3
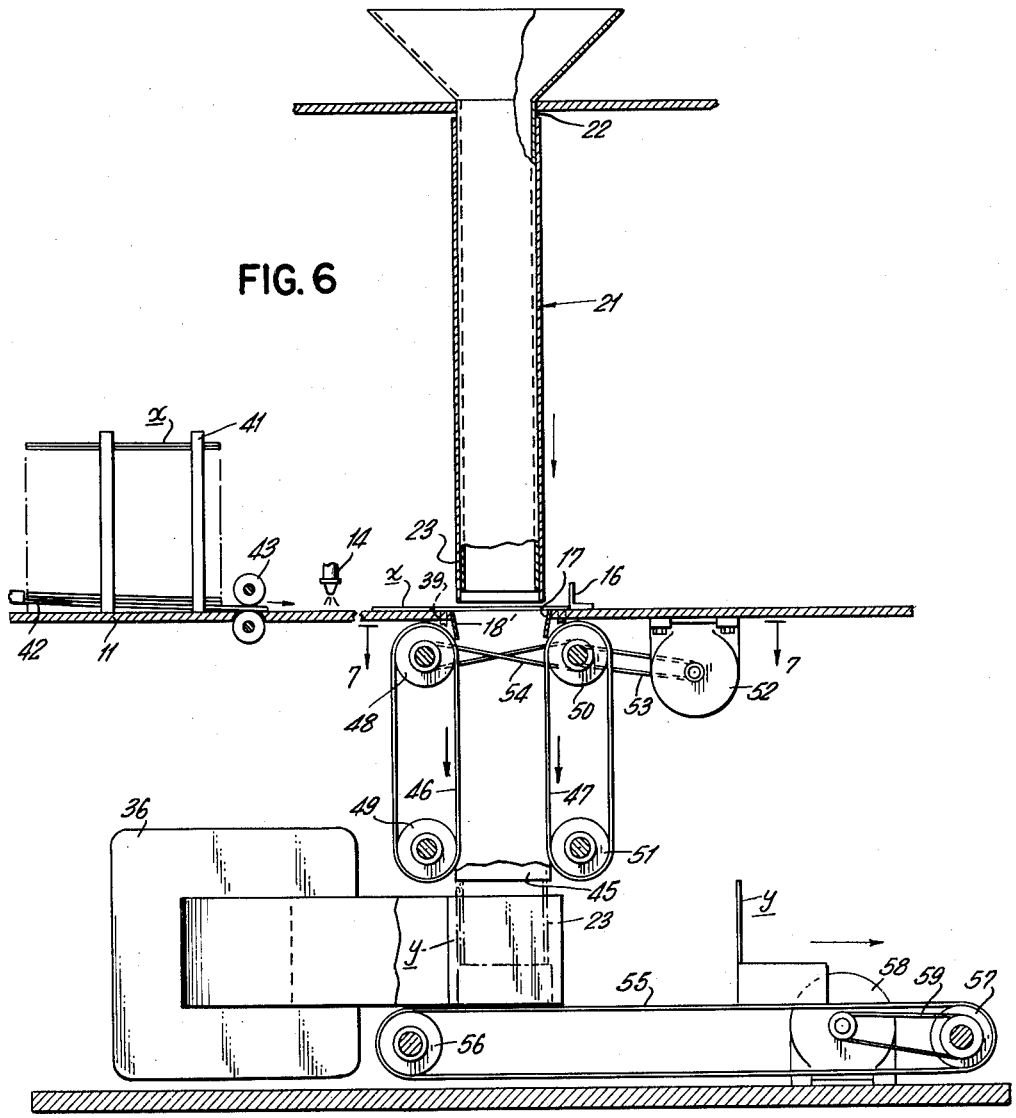
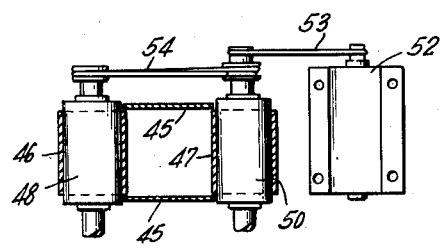
FIG. 7
INVENTOR.
STUART OTTO
BY
ATTORNEYS

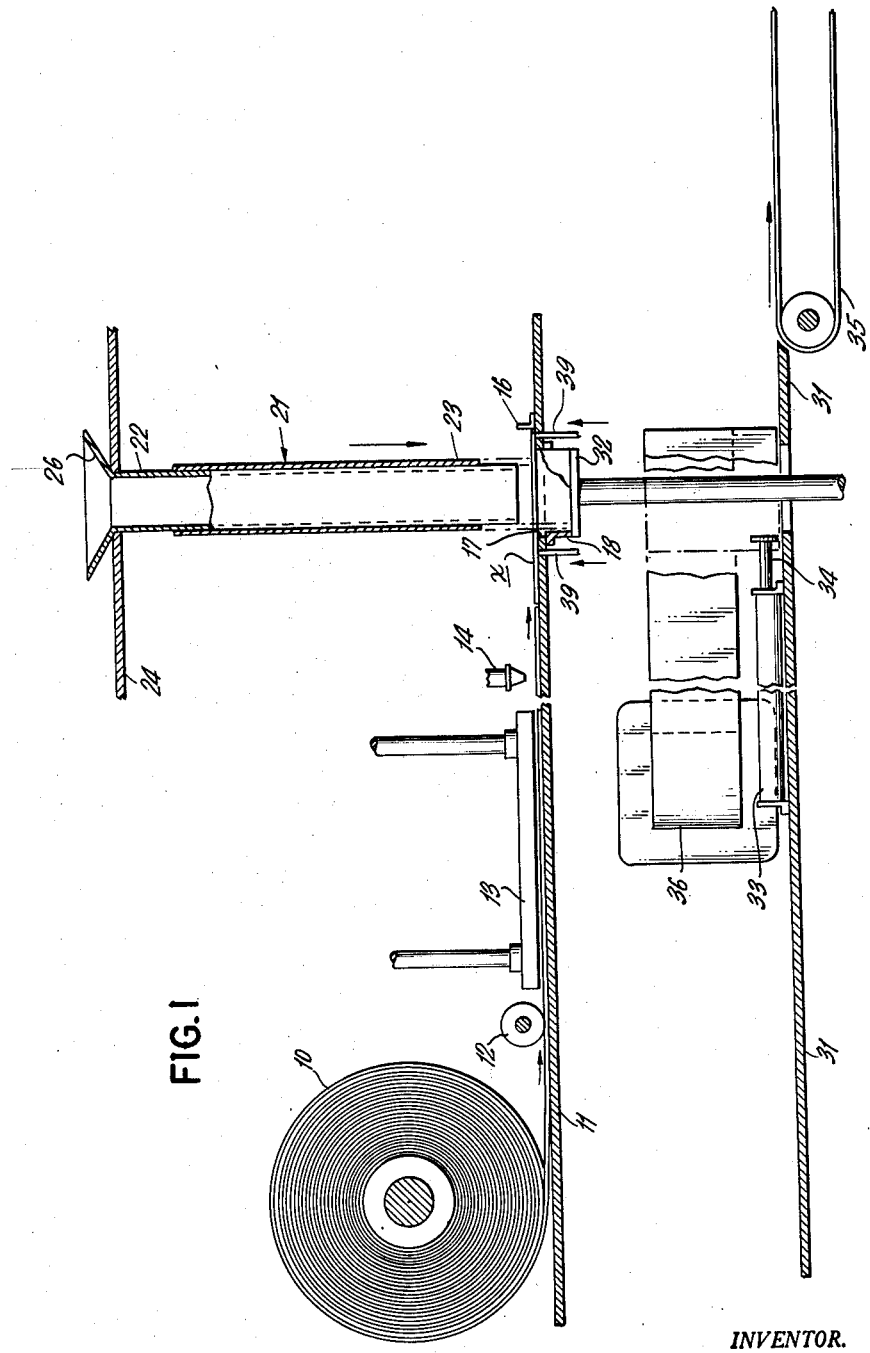

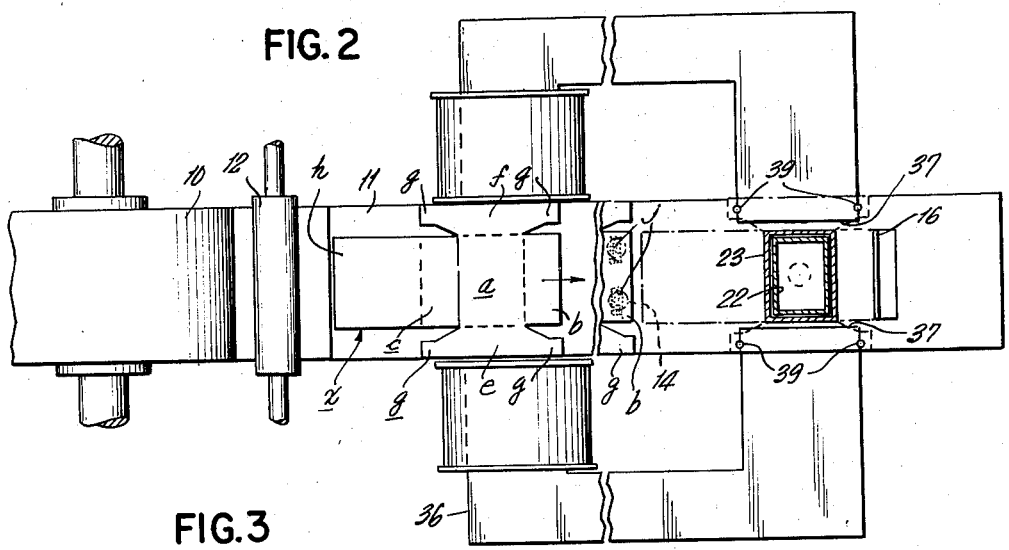
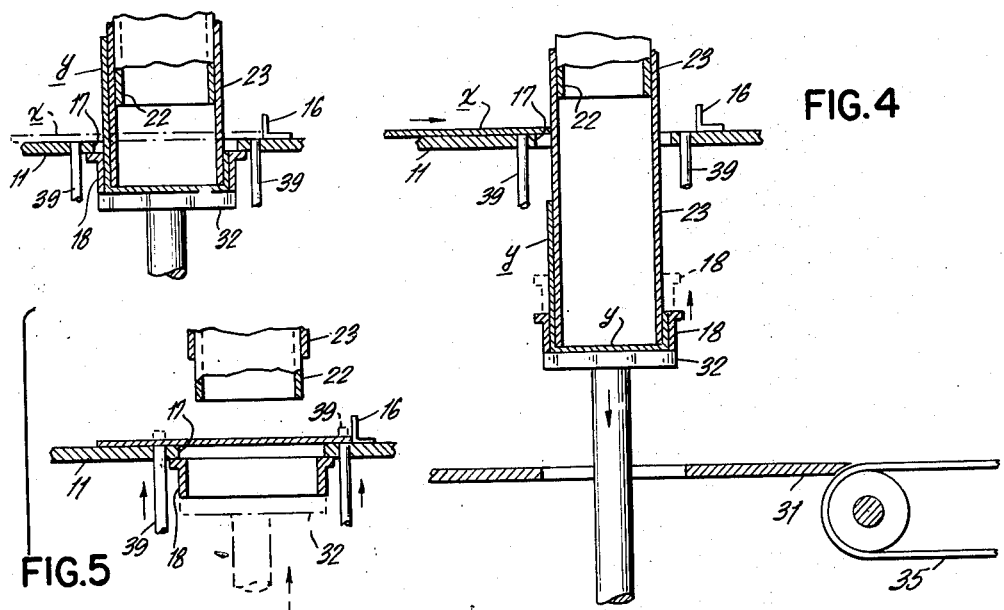
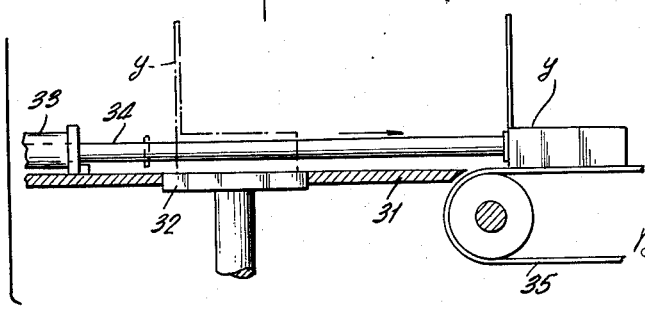

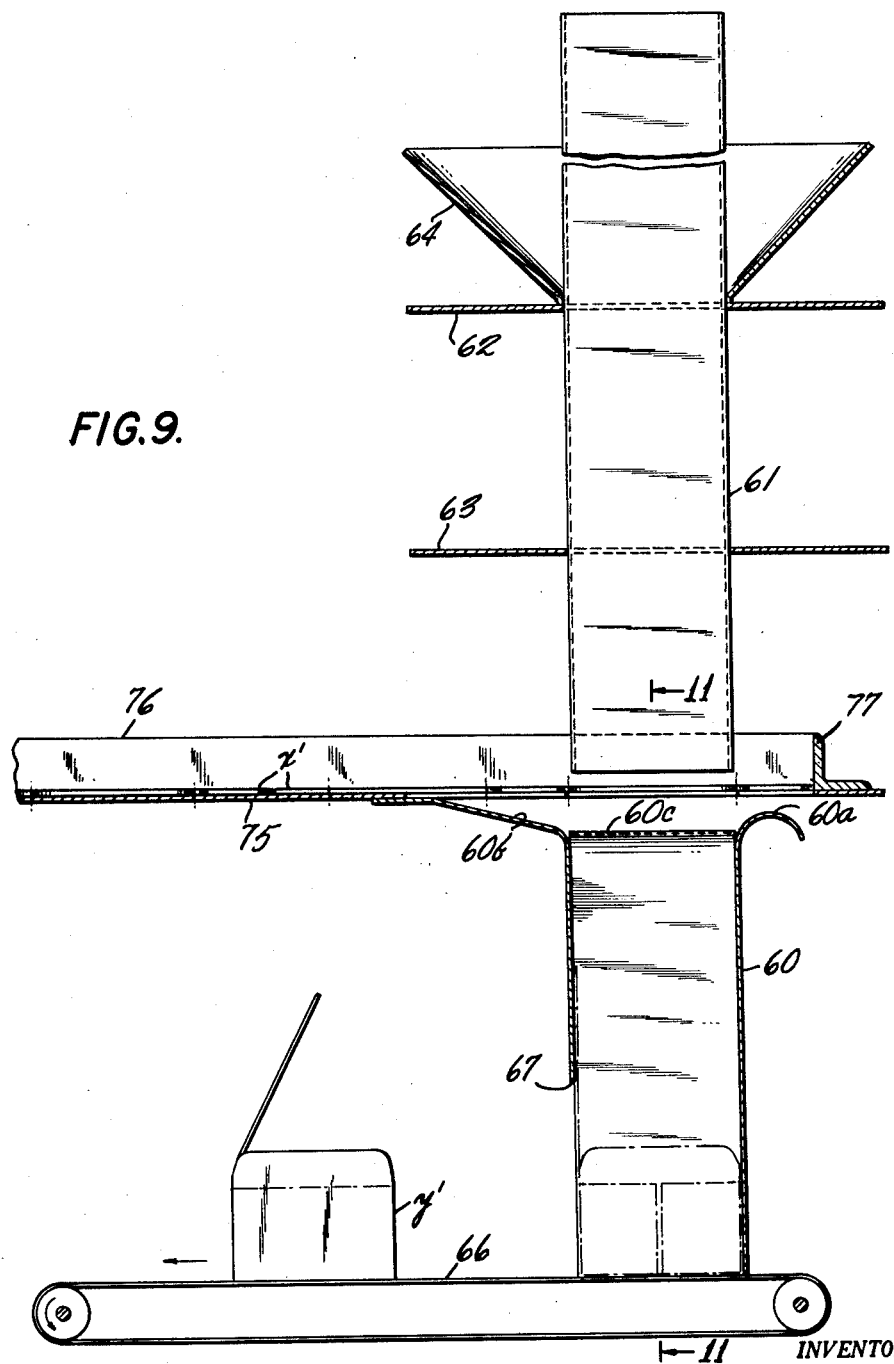

Sept. 1, 1964 S. OTTO 3,146,565
APPARATUS FOR FORMING AND FILLING CONTAINERS
Filed Sept. 29, 1960 6 Sheets-Sheet 6

INVENTOR.
STUART OTTO
BY
his ATTORNEYS.

United States Patent Office 3,146,565
Patented Sept. 1, 1964

3,146,565
APPARATUS FOR FORMING AND FILLING CONTAINERS
Stuart Otto, late of 34 Sylvan Road N., Westport, Conn.; Margaret G. Otto, executrix of said Stuart Otto, deceased
Filed Sept. 29, 1960, Ser. No. 59,442
1 Claim. (Cl. 53—192)

This invention relates to a novel apparatus for forming and filling containers or cartons. The application is a continuation-in-part of the copending application of Stuart Otto, Serial No. 13,758, filed March 9, 1960, now abandoned.

In the present invention, the container is formed by the cooperation of and relative movement between a chute and a forming die. When the container is thus formed, the articles are dispensed through the chute into the container. Thus, the chute not only helps to form the container, but it provides the passage which conducts the articles to the container.

For a complete understanding of the present invention, reference may be made to the detailed description which follows, and to the accompanying drawings, in which:

FIGURE 1 is a schematic side elevational view of the apparatus for forming containers and packaging articles therein in accordance with the present invention;

FIGURE 2 is a plan view of the apparatus shown in FIGURE 1;

FIGURE 3 is an elevational view in cross-section showing the cooperation between the chute and the forming die in forming a container;

FIGURE 4 is an elevational view similar to FIGURE 3 with the parts shown in different position;

FIGURE 5 is an elevational view similar to FIGURES 3 and 4 showing the formed container in phantom lines in the filling position and in solid lines after it has been displaced from the filling position;

FIGURE 6 is an elevational view partly in cross-section of an alternative embodiment of the invention;

FIGURE 7 is a cross-sectional view taken along the line 7—7 of FIGURE 6, looking in the direction of the arrows.

FIGURE 9 is a vertical cross-sectional view taken along the line 9—9 of FIGURE 8, looking in the direction of the arrows;

Figure 8:
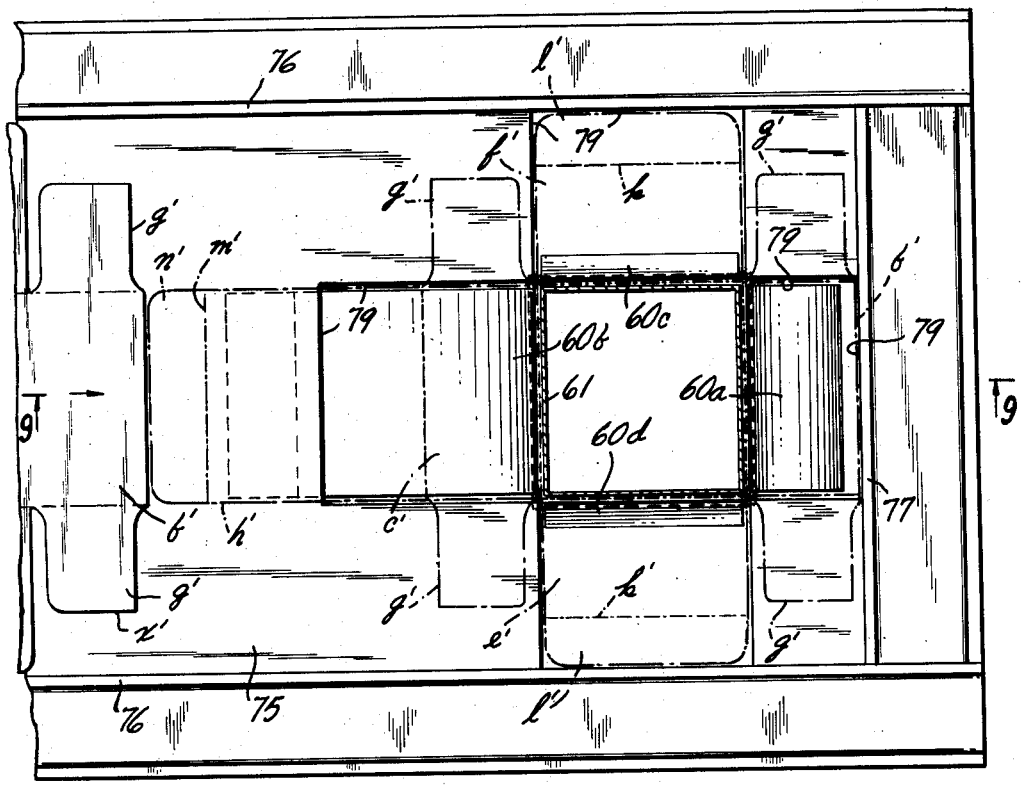
FIGURE 8 is a plan view of still another embodiment of the invention with the chute shown in cross-section.

Referring to FIGURE 1 of the drawings, the containers into which articles are to be packaged in accordance with the present invention are made from blanks cut and scored from a web unwound from a roll 10 of paper or cardboard. The web is fed across the upper surface of a table 11 either manually or by a feed roll 12 to a position beneath a raised cutting and blanking die 13. The cutting and blanking die moves downwardly into contact with the web and not only cuts the outline of the blank $x$ from which the container is made, but also produces the necessary score lines illustrated in dotted lines in FIGURE 2. The score lines define a bottom panel $a$, front and rear panels $b$ and $c$, side panels $e$ and $f$, glue tabs $g$ and a lid or cover $h$. The surplus portion of the web is discarded.

A rotary cylinder can be used in lieu of the vertically movable reciprocating die 13. The cylinder can be used in conjunction with the flat table 11 or with a second impression cylinder in tangential relationship therewith.

The cut and scored container blank $x$ is then advanced by hand or by feed rolls (not shown) beneath a plurality of glue jets 14 which, when actuated, apply the glue to the areas $j$ of the front and rear wall panels of the blank, designated in FIGURE 2 by the shaded areas. Although only one glue jet is shown in FIGURE 1, in a commercial embodiment of the apparatus, it would be preferable to employ as many glue jets as there are areas on which the glue is to be applied, so that the blank can be placed in a registered position below the glue jets before they are actuated.

The blank is then fed to the right, as shown in FIGURE 1, until the leading edge of the blank engages an upstanding stop 16 which registers the blank above a rectangular opening 17 in the table 11. As best shown in FIGURES 1 and 3, a rectangular female forming die 18 is positioned immediately beneath and in alignment with the opening 17. The forming die 18 can be permanently affixed to the underside of the table 11 or, as shown in FIGURES 3 to 5, inclusive, it can be made independently thereof so that it can be moved relatively to the table. When the blank is in registered position on the table over the opening 17, the bottom panel $a$ thereof is in alignment with both the opening and the forming die 18.

A chute 21 is positioned above the table. The chute 21 is made in two parts, a stationary component 22 and a movable component 23 in telescoping relationship therewith. The component 22 of the chute is supported by a frame plate 24. The extreme upper end 26 of the chute component 22 flares outwardly to form a mouth. The articles to be packaged in the container are dropped into the mouth 26 of the chute and fall through the chute into the container below.

A lower level table 31 is provided some distance below the table 11. The containers which are formed by the cooperation of the movable chute element 23 and the forming die 18 are transported to the lower table 31 by a vertically movable platform 32. The platform 32 is pushed by the lower end of the chute from an upper position immediately beneath the forming die 18, the position shown in FIGURE 3, to a lower position at which the upper surface of the platform is at the same level as the upper surface of the table 31, the position shown in FIGURE 5. The table 31 supports a housing 33 for a movable piston 34 which acts as a container pusher. When the formed container $y$ is at the lower position on the platform 32, as shown in phantom lines in FIGURE 5, the articles are dropped into the upper end of the chute, thereby filling the container. The chute 23 is then raised and the filled container is pushed laterally by the movable pusher arm 34 off the platform 32 and across the upper surface of the table 31 to a conveyor belt 35.

The conveyor belt carries the filled container to a delivery station where the lid is closed. The pusher arm 34 is retracted to permit the platform 32 to be raised to its initial position shown in FIGURE 3.

The forming of the container can best be described in connection with FIGURES 3 to 5 of the drawings. When the blank $x$ is positioned in its registered position above the opening 17 and the forming die 18, the movable component 23 of the chute is in the raised position shown in FIGURE 1. The bottom panel $a$ of the blank is approximately the same size or just slightly smaller than the passage through the forming die 18. Moreover, the lower end of the movable chute component 23 is shaped in complementary fashion to the passage through the forming die and its dimensions are just slightly smaller than the passage by an amount which depends on the gauge of the blank $x$. With the blank in its registered position, the chute component 22, descends and its lower end engages the bottom panel $a$ of the blank, pushing it through the opening 17 and the forming die 18 to the upper surface of the platform 32. This cooperation between the movable chute and the forming die automatically erects the four walls and cover of the carton. As the chute component 23 continues its downward movement, the forming die 18 and the platform 32 also descend, as shown in FIGURE 4, thereby maintaining contact between the glue tabs g and the glue spots j. The erected container y is ultimately brought to the lower level shown in FIGURE 5 with the lower end of the chute component 23 still in telescoping relationship therewith. The forming die 18, however, can be raised to its initial position as soon as the glued surface of the carton are effectively secured together. The batch of articles to be packaged in the container is then dropped into the upper end of the chute to fill the container.

If the articles are magnetic, for example, steel nails, it may be desirable to orient them in parallel relationship within the carton. Toward this end, a powerful electromagnet 36 is provided with its pole faces 37 (see FIGURE 2) on opposite sides of the lower end of the chute component 23 in its lowermost position. The electromagnet produces a strong magnetic field across the chute which orients the articles falling through the chute. When the electromagnet is effectively deenergized, the articles settle into the container in parallel relationship. Jogging or vibrating the platform will help settle them in the container. For a more complete understanding of the components of the parallel packaging machine, reference can be made to United States Letters Patents granted to Stuart Otto, Nos. 2,581,042, 2,602,942, 2,899,783 and 2,916,862. It should be understood, of course, that the present invention is not limited in its application to parallel packaging machines but is applicable to packaging machines generally.

In setting up the container, it is important that the glue tabs g be inside the front and rear walls b and c in contact with the glue spots j thereon. This can be insured in various ways. For example, in FIGURES 2 and 3, vertically movable fingers 39 are provided in the table 11 and positioned so that they are recessed in the table directly beneath the glue tabs g when the blank is in the registered position against the stops 16. When the chute component 23 comes into engagement with the bottom panel a of the container, the fingers 39 are moved upwardly, thereby bending the glue flaps with respect to the end walls e and f before the bottom panel a is pushed very far into the forming die 18. This deflection of the glue tabs insures that, as the end walls e and f are pivoted upwardly with respect to the bottom panel a, the glue tabs will be positioned inside the front and rear walls b and c. Of course the glue tabs g can also be bent upwardly manually or by automatic means at the gluing station to produce the same result.

As explained above, the apparatus can be modified by utilizing a stationary forming die 18. It is also possible to eliminate the vertically moving platform 32 provided the distance between the upper and lower tables 11 and 31, respectively, is not too great.

In the alternative embodiment of the invention shown in FIGURES 6 and 7, the blanks x are stacked in a hopper 41 and discharged one at a time from the bottom thereof by a reciprocating slide 42. The feed rolls 43 advance the leading edge of the blank into engagement with the stop 16, thereby registering the bottom panel a of the blank above the opening 17 in the table 11 and the forming die 18'. In this case the forming die 18' has slightly tapered walls and is affixed to the underside of the table 11.

The chute 21 is generally of the same structure as described above in connection with FIGURES 1 to 5 of the drawings, and the lower end of the movable component 23 thereof pushes the bottom panel a of the blank through the stationary forming die 18'. In this embodiment an extension of the forming die 18' is defined by two oppositely disposed stationary walls 45 and two oppositely disposed moving belts 46 and 47. The belt 46 passes around upper and lower pulleys 48 and 49, and the belt 47 passes around similar upper and lower pulleys 50 and 51. The pulley 50 is driven by an electrical motor 52 through a belt drive 53. The drive is transmitted from the pulley 50 through a belt 54 to the pulley 48. The pulleys 48 and 50 are driven in such fashion that the inner spans of the belts 46 and 47 travel downwardly thereby eliminating friction between the outer surfaces of the container and the belts. The lower end of the movable chute element 23 travels at approximately the same velocity as the belts or at a slightly greater velocity so that the container remains in telescoping relationship with the lower end of the chute component 23. The belts 46 and 47 maintain sufficient pressure on the outside surfaces of the container to insure that the glue tabs are held pressed against the front and rear walls to which they are to be secured.

A conveyor belt 55 is provided beneath the lower ends of the belts 46 and 47. The set up container is received upon the upper span of the conveyor belt 55 with the lower end of the movable chute component 23 still in telescoping relationship with the container. The conveyor 55 passes around the pulleys 56 and 57, the latter being driven by a motor 58 through a drive transmission 59. The conveyor belt 55 can be driven either at a constant speed, in which case the container y is held in slipping relationship with the upper span of the conveyor belt, or it can be driven intermittently, in which case the conveyor belt will be stopped at the time when the container is brought to rest on is upper span.

With the lower end of the chute component 23 still in telescoping relationship with the set up container y, a batch of articles to be packaged is dropped into the upper end of the chute and the container is filled. Thereupon the movable chute component 23 moves upwardly out of telescoping relationship with the container, and the filled container is moved to the right, as viewed in FIGURE 6, by the conveyor belt.

It is preferred that the supporting shafts for the belt pulleys 48 and 50 be adjustably mounted for movement toward and away from each other to enlarge or decrease the spacing therebetween within limits. The belt pulleys 49 and 51 can be similarly supported. Also, the opposite walls 45 are adjustable toward and away from each other.

Still another embodiment of the invention is shown in FIGURES 8 to 11 of the drawings. In this embodiment, a blank x' cut and scored to define a bottom panel a', front and rear panels b' and c', side panels e' and f', glue tabs g' and a lid or cover h' is fed across the plate 75 between the side guide walls 76 to the registration stop 77. The side walls of the blank are scored along lines k' to provide flaps l' which are folded inwardly over the contents of the carton, and the cover is scored along a line m' to provide a tuck in flap n'. When the blank is in registered position, the blank is positioned above the cross-shaped slot defined by the edges 79, the blank being supported chiefly by the glue tabs g' and the portion of the lid h' which extends beyond the slot and receives support from the plate 75.

The blank is relatively rigid so that the leading edge of the blank will travel across the slot 79 as it is fed along the top of the table 75. If desired, however, the blank can be advanced by suction feeders which will support the leading edge of the blank and insure that it comes into registered contact with the stop 77.

A die 60 of rectangular cross-section is positioned beneath the slot and a filling chute 61 is positioned above the blank. The filling chute 61 is guided for vertical movement by the stationary upper and lower guides 62 and 63, and the upper guide 62 supports a hopper 64 through which the fill is introduced into the upper end of the chute when the chute moves downwardly into the forming die 60 to erect the carton.

The upper end of the forming die 60 includes four outwardly extending guide walls 60a, 60b, 60c and 60d. The wall 60a extends beneath the front portion of the cross-shaped slot in the plate 75 and lies beneath the front wall panel b' of the blank. The wall 60b extends below the rear portion of the slot and lies beneath the rear wall panel c' of the blank. The remaining two guide walls 60c and 60d extend laterally and lie beneath the side wall panels e' and f' of the blank. The guide walls 60a and 60b extend higher than the guide walls 60c and 60d to permit them to engage the front and rear wall panels of the blank before the guide walls 60c and 60d engage the side wall panels e' and f', thereby insuring that the front and rear wall panels of the blank will be folded upwardly before the side wall panels are folded upwardly.

As the lower end of the filling chute 61 comes into engagement with the bottom panel a' of the blank, the edges 79 of the cross-shaped slot in the plate 75 bend the glue tabs g' upwardly to insure that they will be tucked inside the side wall panels. The front and rear wall panels b' and c' come into engagement with the higher guide walls 60a and 60b before the side wall panels e' and f' come into engagement with the lower guide walls 60c and 60d. This sequence insures that the glue tabs g' will be disposed inside the side wall panels and eliminates the necessity for the movable fingers 39 described above in connection with the embodiment of the invention shown in FIGURE 1.

The carton y' is formed as it is pushed through the die 60 by the lower end of the filling chute. The carton ultimately comes into engagement with the upper span of a continuously or intermittently driven conveyor 66 where it is filled through the filling chute before the filling chute is raised. When the filling chute is raised, the erected and filled carton y' is carried by the conveyor beneath the edge 67 in one wall of the die.

Figure 11:
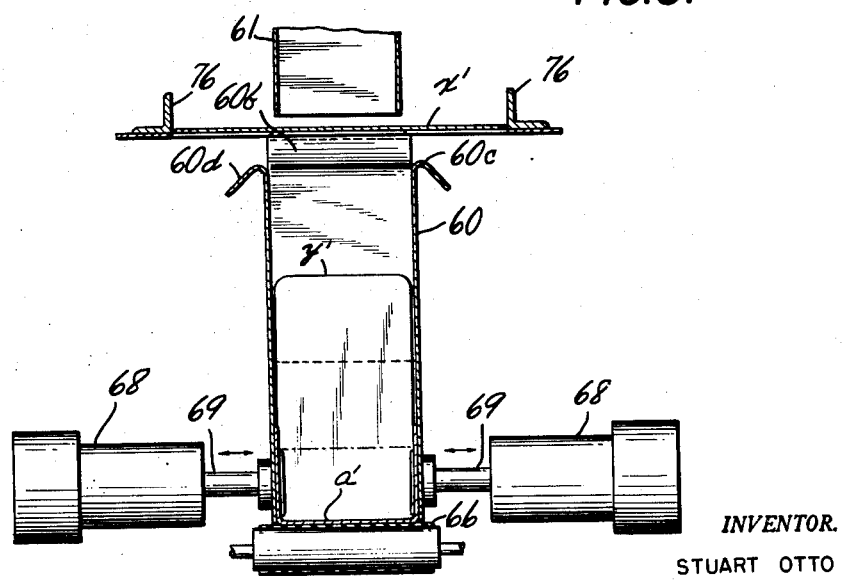
FIGURE 11 is a vertical cross-sectional view taken along the line 11—11 of FIGURE 9, looking in the direction of the arrows.
Figure 10:
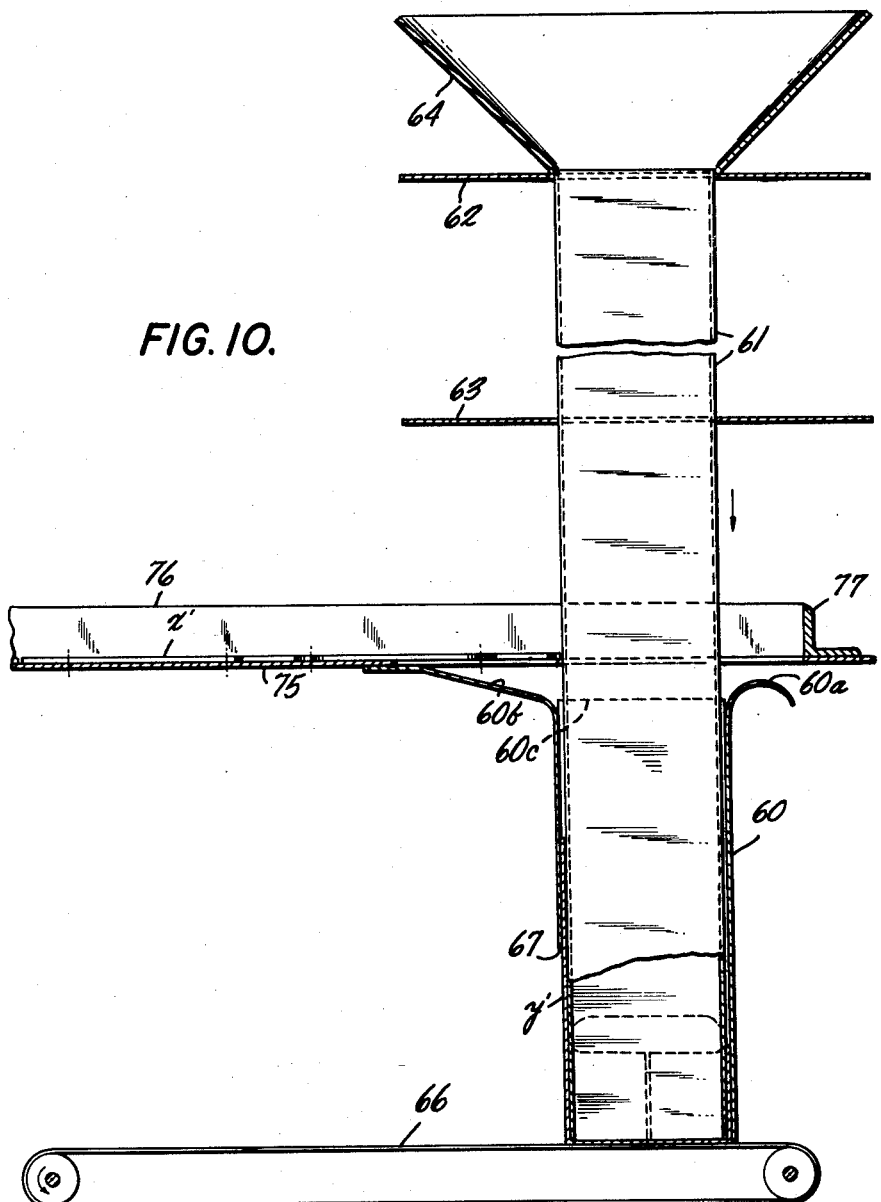
FIGURE 10 is a view similar to FIGURE 9 with the parts shown in different positions.

As best shown in FIGURE 11, a pair of air cylinders 68 having movable pistons 69 can be stationed on both sides of the forming die to insure that the glue tabs are adhered to their respective walls. Toward this end, the walls of the forming die are made somewhat flexible and the pistons 69 are actuated before the filling chute is raised out of telescoping relationship with the carton. The pressure exerted by the pistons will urge the walls of the die against the corresponding outer surfaces of the filling chute, thereby applying the necessary pressure between the glue tabs and the side wall panels of the carton.

The invention has been shown in preferred forms by way of example only, and obviously many variations and modifications may be made therein without departing from the spirit of the invention. The invention, therefore, is not to be limited to any specified form or embodiment, except insofar as such limitations are set forth in the appended claim.

I claim:

An apparatus for forming a carton from a blank which is pre-scored to define a bottom panel, side wall panels, and tabs for connecting together adjacent side panels in an upright position comprising a forming die having a passage therethrough which, when viewed in cross-section, has the same shape as the bottom panel of the blank, said passage through the die being defined by substantially vertical walls and having an upper end to receive the bottom panel of the pre-scored carton and a lower end to discharge the set-up carton therethrough, an overhead chute having a filling passage therein, the outer surface of the chute being shaped in complementary fashion to the passage through the die and each outer wall of the chute being closely spaced to a corresponding wall of the forming die, a slotted table extending between the chute in its uppermost position and the forming die to support the blank, at least a part of the slot through the table being disposed between the chute and the die, said slot being shaped so that a greater proportion of the tab overlies the table than each side wall to insure that the tab will be tucked inside the side wall panel to be affixed thereto, and guiding means for a blank fed between the chute and the forming die to position the bottom panel of the blank above the slot through the table and in alignment with the passage through the forming die, the upper edges of the walls of the forming die engaging the side wall panels to be affixed to the tabs being lower than the others so that other side wall panels will be set up first, thereby further insuring that the tabs will be tucked inside the side wall panels to be affixed thereto, whereby the relative movement between the forming die and the chute brings the chute into engagement with the bottom panel of the blank causing the forming die to set up the side walls of the blank so that the carton can be filled through the chute, the outer walls of the filling chute cooperating with the walls defining the forming die to apply pressure to press the tabs against the surfaces to which they are to be affixed.

References Cited in the file of this patent

UNITED STATES PATENTS

| | | |
|---|---|---|
| 646,355 | Butler et al. | Mar. 27, 1900 |
| 782,987 | Pollard | Feb. 21, 1905 |
| 1,964,122 | Johnson | June 26, 1934 |
| 2,094,402 | Grover | Sept. 28, 1937 |
| 2,096,278 | Huebsch et al. | Oct. 19, 1937 |
| 2,532,871 | Wagner | Dec. 5, 1950 |
| 2,669,077 | Benz | Feb. 16, 1954 |
| 2,820,403 | Plough et al. | Jan. 21, 1958 |
| 2,885,842 | Boitel | May 12, 1959 |
| 2,977,861 | Gibb | Apr. 4, 1961 |
| 2,997,928 | Hoy Rup | Aug. 29, 1961 |
| 3,056,337 | Bahr et al. | Oct. 2, 1962 |

FOREIGN PATENTS

| | | |
|---|---|---|
| 521,084 | Germany | Mar. 18, 1931 |